(12) United States Patent
Svensson et al.

(10) Patent No.: US 12,025,162 B2
(45) Date of Patent: Jul. 2, 2024

(54) SET OF PANELS WITH A MECHANICAL LOCKING DEVICE

(71) Applicant: Välinge Innovation AB, Viken (SE)

(72) Inventors: Johan Svensson, Kattarp (SE); Peter Derelöv, Viken (SE)

(73) Assignee: Välinge Innovation AB, Viken (SE)

( * ) Notice: Subject to any disclaimer, the term of this patent is extended or adjusted under 35 U.S.C. 154(b) by 610 days.

(21) Appl. No.: 17/185,403

(22) Filed: Feb. 25, 2021

(65) Prior Publication Data

US 2021/0262507 A1    Aug. 26, 2021

(30) Foreign Application Priority Data

Feb. 26, 2020   (EP) ..................... 20159476

(51) Int. Cl.
*F16B 12/46*    (2006.01)
(52) U.S. Cl.
CPC ................... *F16B 12/46* (2013.01)
(58) Field of Classification Search
CPC .... A47B 2220/0058; A47B 2220/0052; A47B 96/201; A47B 47/0042; A47B 47/0075; A47B 2230/06; A47B 2230/07; A47B 2230/0029; A47B 2230/0037; F16B 12/10; F16B 12/12; F16B 12/20; F16B 12/24; F16B 12/44; F16B 12/46; F16B 2012/103;

(Continued)

(56) References Cited

U.S. PATENT DOCUMENTS

| 4,171,150 A * | 10/1979 | Soderlund .............. A47B 96/00 |
| | | 312/265.5 |
| 8,887,468 B2 | 11/2014 | Håkansson et al. |
| 9,375,085 B2 | 6/2016 | Derelöv |

(Continued)

FOREIGN PATENT DOCUMENTS

| CA | 2 631 998 A1 | 11/2008 |
| DE | 25 14 357 A1 | 10/1975 |

(Continued)

OTHER PUBLICATIONS

U.S. Appl. No. 16/386,732, Christian Boo, filed Apr. 17, 2019 (Cited herein as US Patent Application Publication No. 2019/0323532 A1 of Oct. 24, 2019).

(Continued)

*Primary Examiner* — Jonathan P Masinick
(74) *Attorney, Agent, or Firm* — Boone IP Law

(57) ABSTRACT

A set including a first panel, a second panel, a back panel, and a mechanical locking device for locking of a first edge surface of the first panel to a second edge surface of the second panel at a junction plane. The mechanical locking device includes at least one rod-shaped element at the first edge surface and at least one insertion groove at the second edge surface, the rod-shaped element is configured to be inserted into the insertion groove. The mechanical locking device includes a first panel groove on a first panel surface on the first panel and/or a second panel groove on the second panel surface of the second panel. The back panel is configured to cooperate with at least one of the panel grooves, and a locking gear configured to cooperate with the back panel and a panel groove, for locking of the first panel to the second panel.

15 Claims, 9 Drawing Sheets

(58) Field of Classification Search
CPC .......... F16B 2012/145; F16B 2012/463; F16B 2012/466
See application file for complete search history.

(56) References Cited

U.S. PATENT DOCUMENTS

| | | | |
|---|---|---|---|
| 9,538,842 | B2 | 1/2017 | Håkansson et al. |
| 9,655,442 | B2 * | 5/2017 | Boo ........................ F16B 12/26 |
| 9,714,672 | B2 | 7/2017 | Derelöv et al. |
| 9,723,923 | B2 | 8/2017 | Derelöv |
| 9,726,210 | B2 | 8/2017 | Derelöv et al. |
| 9,945,121 | B2 | 4/2018 | Derelöv |
| 10,034,541 | B2 | 7/2018 | Boo et al. |
| 10,202,996 | B2 | 2/2019 | Håkansson et al. |
| 10,415,613 | B2 | 9/2019 | Boo |
| 10,448,739 | B2 | 10/2019 | Derelöv et al. |
| 10,451,097 | B2 | 10/2019 | Brännström et al. |
| 10,486,245 | B2 | 11/2019 | Fridlund |
| 10,506,875 | B2 | 12/2019 | Boo et al. |
| 10,544,818 | B2 | 1/2020 | Fridlund |
| 10,548,397 | B2 * | 2/2020 | Derelöv ................ F16B 12/125 |
| 10,669,716 | B2 | 6/2020 | Derelöv |
| 10,670,064 | B2 | 6/2020 | Derelöv |
| 10,724,564 | B2 | 7/2020 | Derelöv |
| 10,731,688 | B2 | 8/2020 | Brännström et al. |
| 10,736,416 | B2 * | 8/2020 | Derelöv ............... A47B 47/042 |
| 10,830,266 | B2 | 11/2020 | Fridlund |
| 10,830,268 | B2 | 11/2020 | Boo |
| 10,871,179 | B2 | 12/2020 | Håkansson et al. |
| 10,876,562 | B2 | 12/2020 | Pervan |
| 10,876,563 | B2 | 12/2020 | Derelöv et al. |
| 10,968,936 | B2 | 4/2021 | Boo et al. |
| 11,047,415 | B2 * | 6/2021 | Leistert ................... F16B 12/24 |
| 11,076,691 | B2 | 8/2021 | Boo |
| 11,083,287 | B2 | 8/2021 | Boo et al. |
| 11,098,484 | B2 | 8/2021 | Derelöv |
| 11,137,007 | B2 | 10/2021 | Fridlund |
| 11,204,051 | B2 | 12/2021 | Brännström et al. |
| 11,246,415 | B2 | 2/2022 | Derelöv et al. |
| 11,272,783 | B2 | 3/2022 | Derelöv |
| 11,445,819 | B2 * | 9/2022 | Derelöv ................ F16B 12/20 |
| 2008/0282594 | A1 | 11/2008 | Swavola, II |
| 2011/0121560 | A1 * | 5/2011 | Readman ................ F16B 12/24 285/82 |
| 2012/0279161 | A1 | 11/2012 | Håkansson et al. |
| 2013/0048632 | A1 * | 2/2013 | Chen ........................ B65D 9/24 220/4.33 |
| 2015/0035422 | A1 | 2/2015 | Håkansson et al. |
| 2015/0078807 | A1 | 3/2015 | Brännström et al. |
| 2015/0078819 | A1 | 3/2015 | Derelöv et al. |
| 2015/0196118 | A1 | 7/2015 | Derelöv |
| 2015/0198191 | A1 | 7/2015 | Boo |
| 2015/0230600 | A1 * | 8/2015 | Schulte ................... F16B 12/26 312/265.5 |
| 2016/0007751 | A1 | 1/2016 | Derelöv |
| 2016/0174704 | A1 | 6/2016 | Boo et al. |
| 2016/0270531 | A1 | 9/2016 | Derelöv |
| 2017/0079433 | A1 | 3/2017 | Derelöv et al. |
| 2017/0089379 | A1 | 3/2017 | Pervan |
| 2017/0097033 | A1 | 4/2017 | Håkansson et al. |
| 2017/0159291 | A1 | 6/2017 | Derelöv |
| 2017/0208938 | A1 | 7/2017 | Derelöv et al. |
| 2017/0227031 | A1 | 8/2017 | Boo |
| 2017/0227032 | A1 | 8/2017 | Fridlund |
| 2017/0227035 | A1 | 8/2017 | Fridlund |
| 2017/0234346 | A1 | 8/2017 | Fridlund |
| 2017/0298973 | A1 | 10/2017 | Derelöv |
| 2017/0360193 | A1 | 12/2017 | Boo et al. |
| 2018/0080488 | A1 | 3/2018 | Derelöv |
| 2018/0087552 | A1 | 3/2018 | Derelöv et al. |
| 2018/0112695 | A1 | 4/2018 | Boo et al. |
| 2018/0119717 | A1 | 5/2018 | Derelöv |
| 2018/0202160 | A1 | 7/2018 | Derelöv |
| 2018/0328396 | A1 | 11/2018 | Fransson et al. |
| 2019/0113061 | A1 | 4/2019 | Håkansson et al. |
| 2019/0166989 | A1 | 6/2019 | Boo et al. |
| 2019/0191870 | A1 | 6/2019 | Derelöv |
| 2019/0195256 | A1 * | 6/2019 | Derelöv .............. F16B 12/2027 |
| 2019/0289999 | A1 | 9/2019 | Derelöv et al. |
| 2019/0320793 | A1 | 10/2019 | Boo |
| 2019/0323532 | A1 | 10/2019 | Boo |
| 2019/0323533 | A1 | 10/2019 | Boo |
| 2019/0323534 | A1 | 10/2019 | Derelöv |
| 2019/0323535 | A1 | 10/2019 | Derelöv |
| 2020/0003242 | A1 | 1/2020 | Brännström et al. |
| 2020/0055126 | A1 | 2/2020 | Fridlund |
| 2020/0069048 | A1 | 3/2020 | Derelöv et al. |
| 2020/0069049 | A1 | 3/2020 | Derelöv et al. |
| 2020/0102978 | A1 | 4/2020 | Fridlund |
| 2020/0121076 | A1 | 4/2020 | Derelöv et al. |
| 2020/0214447 | A1 | 7/2020 | Derelöv et al. |
| 2020/0300284 | A1 | 9/2020 | Pervan |
| 2020/0337455 | A1 | 10/2020 | Boo et al. |
| 2020/0340513 | A1 | 10/2020 | Derelöv |
| 2021/0079650 | A1 | 3/2021 | Derelöv |
| 2021/0148392 | A1 | 5/2021 | Brännström et al. |
| 2021/0180630 | A1 | 6/2021 | Bruno et al. |
| 2021/0190112 | A1 | 6/2021 | Derelöv |
| 2021/0207635 | A1 | 7/2021 | Håkansson et al. |
| 2021/0222716 | A1 | 7/2021 | Derelöv et al. |
| 2021/0262508 | A1 | 8/2021 | Svensson et al. |
| 2021/0276108 | A1 | 9/2021 | Derelöv et al. |
| 2021/0285480 | A1 | 9/2021 | Derelöv et al. |
| 2021/0381251 | A1 | 12/2021 | Svensson |
| 2022/0018373 | A1 | 1/2022 | Boo |
| 2022/0049735 | A1 | 2/2022 | Meijer |
| 2022/0228615 | A1 * | 7/2022 | Sostar ..................... F16B 12/14 |

FOREIGN PATENT DOCUMENTS

| | | | | |
|---|---|---|---|---|
| DE | 19900831 | C1 * | 5/2000 | .......... A47G 1/0605 |
| DE | 10 2015 103 429 | A1 | 10/2015 | |
| EP | 2468134 | A1 * | 6/2012 | .......... A47B 47/042 |
| WO | WO 2015/105451 | A1 | 7/2015 | |
| WO | 2020046194 | A1 | 3/2020 | |
| WO | WO 2020/046193 | A1 | 3/2020 | |

OTHER PUBLICATIONS

U.S. Appl. No. 16/386,810, Christian Boo, filed Apr. 17, 2019 (Cited herein as US Patent Application Publication No. 2019/0323533 A1 of Oct. 24, 2019).

U.S. Appl. No. 16/553,325, Peter Derelöv and Johan Svensson, filed Aug. 28, 2019 (Cited herein as US Patent Application Publication No. 2020/0069048 A1 of Mar. 5, 2020).

U.S. Appl. No. 16/553,350, Peter Derelöv and Johan Svensson, filed Aug. 28, 2019 (Cited herein as US Patent Application Publication No. 2020/0069049 A1 of Mar. 5, 2020).

U.S. Appl. No. 16/856,765, Peter Derelöv, filed Apr. 23, 2020 (Cited herein as US Patent Application Publication No. 2020/0340513 A1 of Oct. 29, 2020).

U.S. Appl. No. 17/154,344, Peter Derelöv and Johan Svensson, filed Jan. 21, 2021 (Cited herein as US Patent Application Publication No. 2021/0222716 A1 of Jul. 22, 2021).

U.S. Appl. No. 17/173,823, Peter Derelöv and Johan Svensson, filed Feb. 11, 2021 (Cited herein as US Patent Application Publication No. 2021/0276108 A1 of Sep. 9, 2021).

U.S. Appl. No. 17/185,428, Johan Svensson and Peter Derelöv, filed Feb. 25, 2021 (Cited herein as US Patent Application Publication No. 2021/0262508 A1 of Aug. 26, 2021).

U.S. Appl. No. 17/370,521, Christian Boo, filed Jul. 8, 2021.

International Search Report/Written Opinion mailed Mar. 19, 2021 in PCT/EP2021/054743, ISA/European Patent Office, Rijswijk, NL, 9 pages.

Extended European Search Report issued in EP Application No. 20159476.9, May 6, 2020, European Patent Office, Munich, DE, 9 pages.

Boo, Christian, U.S. Appl. No. 17/370,521 entitled "Mechanical Locking System for Panels," filed in the U.S. Patent and Trademark Office on Jul. 8, 2021.

(56) References Cited

OTHER PUBLICATIONS

U.S. Appl. No. 17/588,733, Peter Derelöv and Johan Svensson, filed Jan. 31, 2022.
U.S. Appl. No. 17/674,262, Johan Svensson and Peter Derelöv, filed Feb. 17, 2022.
Derelöv, Peter, et al., U.S. Appl. No. 17/588,733 entitled "Arrangements for Preparing of Furniture Product," filed in the U.S. Patent and Trademark Office on Jan. 31, 2022.
Svensson, Johan, et al., U.S. Appl. No. 17/674,262 entitled "Mechanical Connection Arrangement for Panels," filed in the U.S. Patent and Trademark Office on Feb. 17, 2022.
U.S. Appl. No. 17/709,994, Johan Svensson, filed Mar. 31, 2022.
U.S. Appl. No. 17/710,055, Johan Svensson, filed Mar. 31, 2022.
U.S. Appl. No. 17/883,203, Christian Boo, filed Aug. 8, 2022.
U.S. Appl. No. 17/886,517, Peter Derelöv, filed Aug. 12, 2022.
U.S. Appl. No. 18/191,444, Johan Svensson, filed Mar. 28, 2023.
U.S. Appl. No. 18/312,808, Johan Svensson, filed May 5, 2023.
U.S. Appl. No. 18/383,242, Peter Derelöv, filed Oct. 24, 2023.
International Preliminary Report on Patentability received for PCT Patent Application No. PCT/EP2021/054743, mailed on Sep. 9, 2022, 8 pages.

\* cited by examiner

SET OF PANELS WITH A MECHANICAL LOCKING DEVICE

CROSS REFERENCE TO RELATED APPLICATIONS

The present application claims the benefit of European Application No. 20159476.9, filed on Feb. 26, 2020. The entire contents of European Application No. 20159476.9 are hereby incorporated herein by reference in their entirety.

TECHNICAL FIELD

Embodiments of the present invention relate to panels that may be arranged perpendicular to each other and locked together with a mechanical locking device. The panels may be assembled and locked together to obtain a furniture product, such as a bookshelf, a cupboard, a wardrobe, a box, a drawer or a furniture component.

TECHNICAL BACKGROUND

A furniture product provided with a mechanical locking device is disclosed in PCT/SE/2019/050802. The furniture product comprises a first panel connected mainly perpendicular to a second panel by a mechanical locking device. The mechanical locking device may comprise inclined pins, a back panel and a locking part.

The above description of various known aspects is the applicant's characterization of such, and is not an admission that any of the above description is considered as prior art.

Embodiments of the present invention address a need to provide panels that may be easily assembled.

SUMMARY

It is an object of certain aspects of the present invention to provide an improvement over the above described techniques and known art; particularly to facilitate assembling of panels configured to be assembled without the need of using any tools.

A further object of at least certain aspects of the present invention is to facilitate assembling of panels configured to be assembled with a locking device that is easy to manufacture and to use, which reduces the risk of incorrect installation thereof.

A further object of at least certain aspects of the present invention is to facilitate assembling of panels configured to be assembled in a more stable and aesthetic way.

A further object of at least certain aspects of the present invention may be to avoid the need to provide edge-banding of the edges of panels.

At least some of these and other objects and advantages that will be apparent from the description have been achieved by a set comprising a first panel with a first main plane and a first panel surface, a second panel with a second main plane and a second panel surface, a back panel and a mechanical locking device for locking of a first edge surface of the first panel to a second edge surface of the second panel at a junction plane, wherein the first main plane is essentially perpendicular to the second main plane and the junction plane extends at a first angle to the first main plane, the mechanical locking device comprises at least one rod-shaped element at the first edge surface and at least one insertion groove at the second edge surface, the rod-shaped element is configured to be inserted into the insertion groove, the rod-shaped element extends at a second angle from the first edge surface, the insertion groove extends into the second edge surface at a third angle from the second edge surface, the mechanical locking device further comprises a first panel groove on a first panel surface on the first panel, and/or a second panel groove on the second panel surface of the second panel, wherein the back panel is configured to cooperate with at least one of the first panel groove and the second panel groove, and at least one locking gear configured to cooperate with the back panel and at least one of the first panel groove and the second panel groove, for locking of the first panel to the second panel, wherein the first angle between the junction plane and the first main plane is about 45°.

The first panel, the second panel and the back panel may be wood based panels.

The first panel, the second panel and the back panel may be furniture panels.

The first angle between the junction plane and the first main plane may be about 45°. A different angle may be preferred for a set with different thicknesses of the first and the second panel.

The angle may be adapted such that the junction plane extends through an intersection of an outer face of the first panel and an outer face of the second panel to an intersection of an inner face of the first panel and an inner face of the second panel.

The inner face of the first panel may be facing the inner face of the second panel. An outer face of the first panel may be opposite to the inner face of the first panel. An outer face of the second panel may be opposite to the inner face of the second panel.

An outer corner at the junction plane of the first and the second panel may comprise a beveled edge, preferably covered by a decorative layer. The bevel may increase the strength of the corner. The decorative layer may be a plastic foil, veneer or paint.

According to an aspect a width of at least one of the first panel groove and the second panel groove minus a thickness of the back panel is larger than or essentially the same as an extension of the rod-shaped element along the first edge surface.

According to an aspect the second angle is within the range of about 30° to about 60°, or within the range of about 40° to about 50°, or about 45°.

According to an aspect the mechanical locking device comprises at least two rod-shaped elements.

According to an aspect the mechanical locking device comprises two or more rod-shaped elements, arranged in a row essentially parallel to the first or second edge surface.

According to an aspect the rod-shaped element is arranged in a rod element groove in the first edge surface.

According to an aspect the rod element groove is a drill hole.

According to an aspect the drill hole is a bottom-ended drill hole.

According to an aspect the width of the first panel groove is essentially the same as the width of the second panel groove.

According to an aspect the first panel comprises a third edge surface, the second panel comprises a fourth edge surface, the first panel groove is substantially parallel to the third edge surface and the second panel groove is substantially parallel to the fourth edge surface.

According to an aspect the first panel groove extends substantially along the entire third edge surface and the second panel groove extends essentially along the entire fourth edge surface.

According to an aspect at least one of the first panel groove and the second panel groove is bottom-ended.

According to an aspect the locking gear is configured to further cooperate with the back panel, for locking of the back panel to the first and/or second panel.

According to an aspect the locking gear is flexible.

According to an aspect the locking gear comprises a spring.

According to an aspect the locking gear comprises a wedge element.

According to an aspect an extension of the back panel from the intersection between the first edge surface and the first panel surface of the first panel, when one first panel, one second panel and one back panel have been assembled, is less than an extension of the rod shaped element from said intersection.

According to an aspect the first or second edge surface comprises a tongue, wherein said tongue comprises a first tongue surface and a second tongue surface and the other of said opposite first or second edge surface comprises a tongue groove.

According to an aspect the mechanical locking device comprises a first space between the tongue groove and the first tongue surface and/or the second tongue surface when the set is in a locked position.

According to an aspect the tongue groove comprises one or more rod-shaped elements.

According to an aspect the rod element groove is reinforced by plastic, e.g. thermoplastic and/or liquid, e.g. PVAc-glue.

According to an aspect the core of the first panel and/or of the second panel and/or the back panel may be a wood-based core, such as MDF, HDF, OSB, WPC, plywood or particleboard. The core may also be a plastic core comprising thermosetting plastic or thermoplastic, e.g., vinyl, PVC, PU or PET. The plastic core may comprise fillers.

The first panel and/or the second panel and/or the back panel may also be of solid wood.

The first panel and/or the second panel and/or the back panel may be provided with a decorative layer, such as a foil or a veneer, on one or more surfaces.

At least some of the above identified and other objects and advantages that may be apparent from the description have been achieved by a locking device for a furniture product in accordance with the above.

BRIEF DESCRIPTION OF THE DRAWINGS

These and other aspects, features and advantages of which embodiments of the invention are capable of, will be apparent and elucidated from the following description of embodiments and aspects of the present invention, reference being made to the accompanying drawings, in which.

DETAILED DESCRIPTION

Figure 1A:
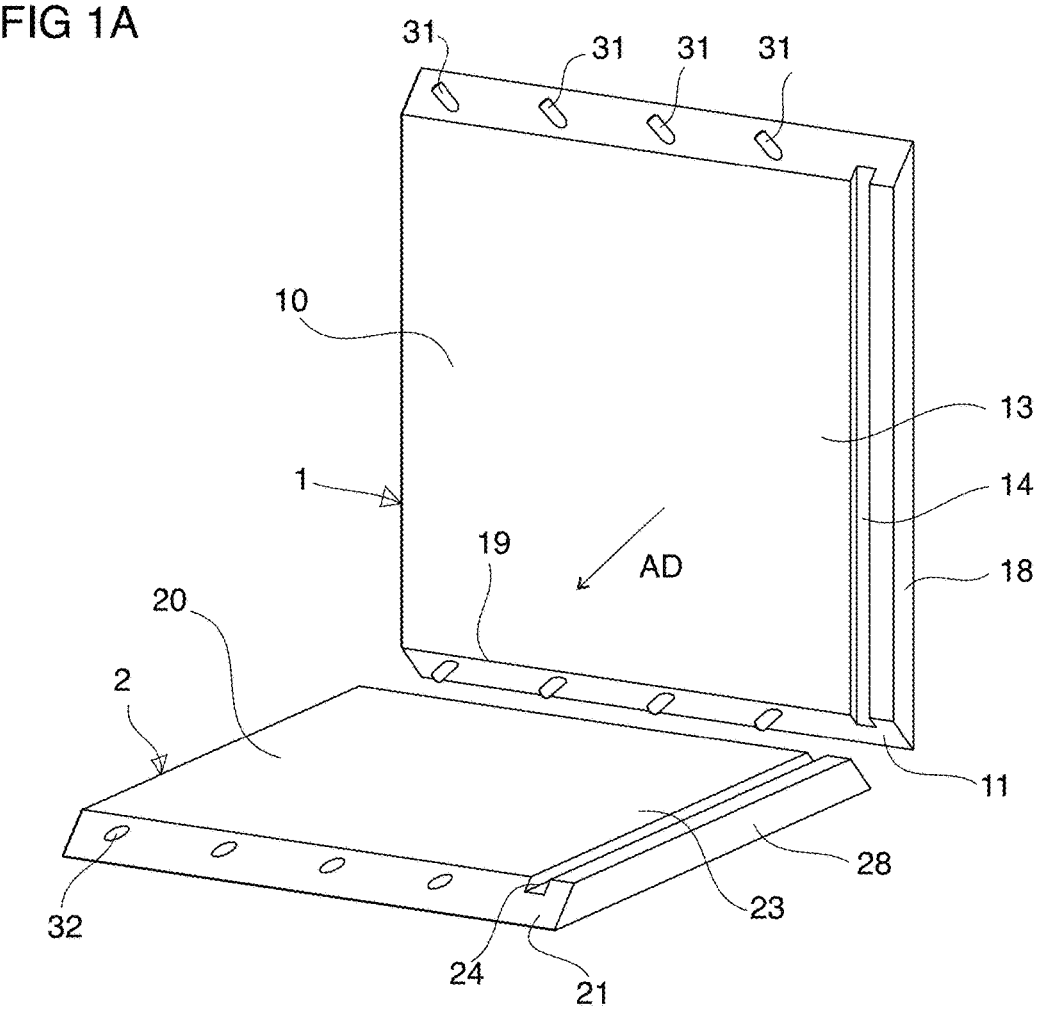
FIG. 1A shows a 3D view of a set in an unassembled state of an aspect of the invention.
Figure 1B:
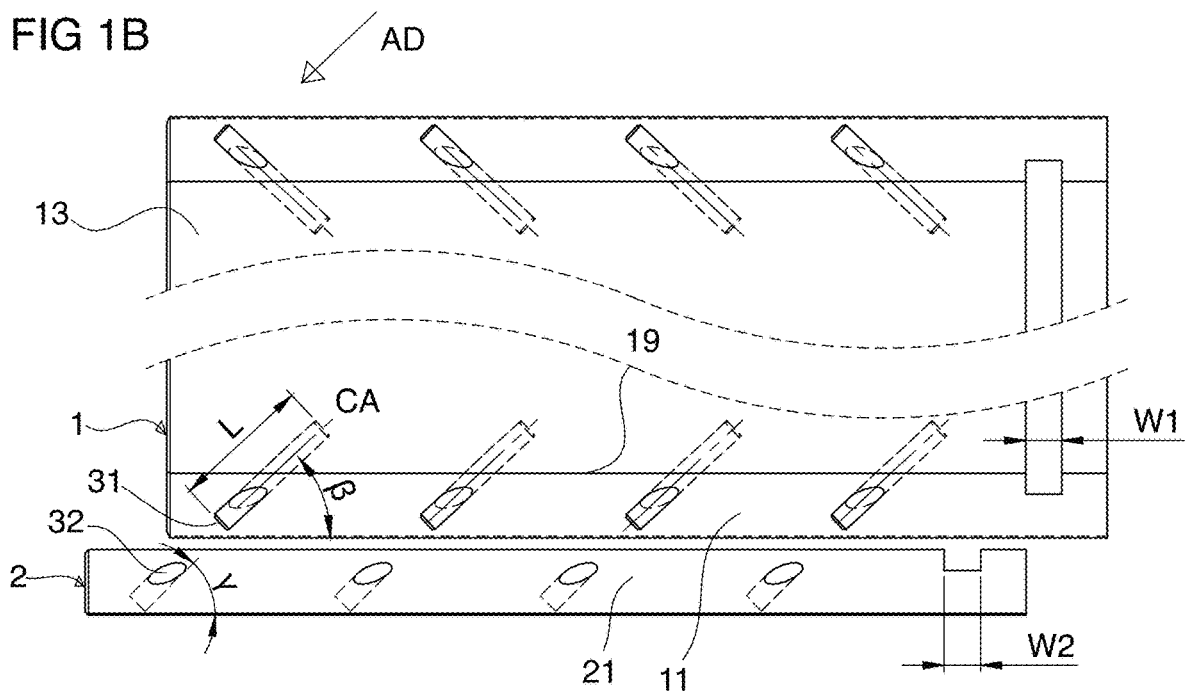
FIG. 1B shows an embodiment of the first panel and the second panel in a side-view in a non-locked position.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

In the drawings and specification, there have been disclosed exemplary aspects of the disclosure. However, many variations and modifications may be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation, for example, definition of dimensions such as width or breadth or height or length or diameter depends on how exemplary aspects are depicted, hence, if depicted differently, a shown width or diameter in one depiction is a length or thickness in another depiction.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example aspects may be implemented at least in part by means of both hardware and software, and that several "means", "units" or "devices" may be represented by the same item of hardware.

The different aspects, alternatives and embodiments of the invention disclosed herein may be combined with one or more of the other aspects, alternatives and embodiments described herein. Two or more aspects may be combined.

Embodiments of the set of the invention are shown in FIGS. 1A-1B and 3A-9B including a set comprising a first panel 1 with a first main plane 10 and a first panel surface 13, a second panel 2 with a second main plane 20 and a second panel surface 23, a back panel 40 and a mechanical locking device for locking of a first edge surface 11 of the first panel 1 to a second edge surface 21 of the second panel 2 at a junction plane J. The first main plane 10 may be essentially perpendicular to the second main plane 20. The junction plane J extends at a first angle α to the first main plane 10. The mechanical locking device comprises at least one rod-shaped element 31 at the first edge surface 11 and at least one insertion groove 32 at the second edge surface 21. The rod-shaped element 31 is configured to be inserted into the insertion groove 32. The rod-shaped element 31 extends at a second angle β from the first edge surface 11. The insertion groove 32 extends into the second edge surface 21 at a third angle γ from the second edge surface 21. The mechanical locking device further comprises a first panel groove 14 on a first panel surface 13 on the first panel 1, and/or a second panel groove 24 on the second panel surface 23 of the second panel 2. The back panel 40 is configured to be inserted into and cooperate with at least one of the first panel groove 14 and the second panel groove 24, and at least one locking gear 50 configured to cooperate with the back panel 40 and at least one of the first panel groove 14 and the second panel groove 24, for locking of the first panel 1 to the second panel 2. The first angle α between the junction plane J and the first main plane 10 may be within a range of about 30° to 60°, or within the range of 40° to 50°, or about 45°.

This results in a very aesthetic look to the set of panels when they are assembled. Further, since the first angle α between the junction plane J and the first main plane 10 is about 45°, there is no longer a need for edge-banding of the edges of panels.

The first panel 1, the second panel 2, and the back panel 40 may be panels for a furniture product and may be part of a frame of a furniture product.

The first panel 1, the second panel 2, and the back panel 40 may be wood based panels.

FIGS. 1A-1B and 5A-7 disclose embodiments where the panels are in an unassembled state. FIGS. 3A-4B and 8-9B disclose embodiments where the panels are in an assembled state.

The set may be assembled by displacing the first panel 1 relative the second panel 2 in an assembly direction AD which is essentially parallel with the first panel surface 13.

The assembly direction AD may be essentially parallel with the second angle β and/or the third angle γ.

The second angle β may be within the range of about 30° to about 60°, or within the range of about 40° to about 50°, or about 45°.

According an embodiment of the invention the third angle γ may be within the range of about 30° to 60°, or within the range of 40° to 50°, or about 45°.

According an embodiment of the invention the second angle β and the third angle γ may be essentially the same.

The second angle β may be measured in a plane parallel to the first panel surface 13.

The third angle γ may be measured in a plane which is perpendicular to the second panel surface 23 and parallel to second edge surface 21.

According to an aspect, the mechanical locking device may comprise at least two rod-shaped elements 31. When the mechanical locking device comprises two or more rod-shaped elements 31, the rod-shaped elements 31 may be arranged in a row essentially parallel to the first or second edge surface 11,21.

The first edge surface 11 may comprise two or more of said rod-shaped element 31 and the second edge surface 21 may comprise two or more of said insertion groove 32, and vice versa, which may be arranged linearly, wherein each of the rod-shaped elements 31 is configured to be inserted into an insertion groove 32.

The rod-shaped element 31 may be configured to cooperate, in a locked position, with the bottom surface of the insertion groove 32.

The sidewalls of the insertion groove 32 may comprise material of the core of the first panel 1 or the second panel 2, dependent on in which panel the insertion groove 32 is made and in which panel the rod-shaped element 31 is attached. According to an aspect they may also be enforced with, e.g., metal or glass fiber.

The rod-shaped element 31 may be arranged in a rod element groove 36 in the first edge surface 11. The rod element groove 36 may be a drill hole. In one embodiment the drill hole is a bottom-ended drill hole.

The rod-shaped element 31 may be configured to be attached in the rod element groove 36 by friction.

The rod-shaped element 31 may be configured to be glued in the rod element groove 36.

The rod-shaped element 31, the rod element groove 36 and the insertion groove 32 may have a substantially circular shape, although other shapes, such as triangular, rectangular, square, etc., are possible.

The rod-shaped element 31 may be made from one or more of a wood based material, a polymer material, which may comprise reinforcement, such as glass fiber or a metal.

The rod shaped element 31 may have a waxed surface to facilitate assembly.

The first panel groove 14 may comprise a width W1.

The second panel groove 24 may comprise a width W2.

The width W1 of the first panel groove 14 may be essentially the same as the width W2 of the second panel groove 24.

The width (W1, W2) of at least one of the first panel groove 14 and the second panel groove 24 minus a thickness T of the back panel 40 may be larger than or essentially the same as an extension E of the rod-shaped element 31 along the first edge surface 11; the extension E being measured perpendicularly to the first edge surface 11.

The first panel 1 may comprise a third edge surface 18, the second panel 2 may comprise a fourth edge surface 28. The first panel groove 14 may be substantially parallel to the third edge surface 18 and the second panel groove 24 may be substantially parallel to the fourth edge surface 28.

According to an aspect the first panel groove 14 may extend substantially along the entire third edge surface 18 and the second panel groove 24 may extend essentially along the entire fourth edge surface 28.

At least one of the first panel groove 14 and the second panel groove 24 may be bottom-ended.

The first 14 and/or second 24 panel groove may be formed by mechanical cutting, such as milling or sawing.

The first panel groove 14 may be formed in the first panel surface 13 and in a core of the first panel 1. The second panel groove 24 may be formed in the second panel surface 23 and in a core of the second panel 2.

The first panel groove 14 and/or the second panel groove 24 may be impregnated/enforced with a liquid.

An extension H of the back panel from the intersection 19 between the first edge surface 11 and the first panel surface 13 of the first panel 1, when one first panel 1, one second panel 2 and one back panel 40 have been assembled, may be less than an extension of the rod shaped element 31 from said intersection 19.

Figure 6:
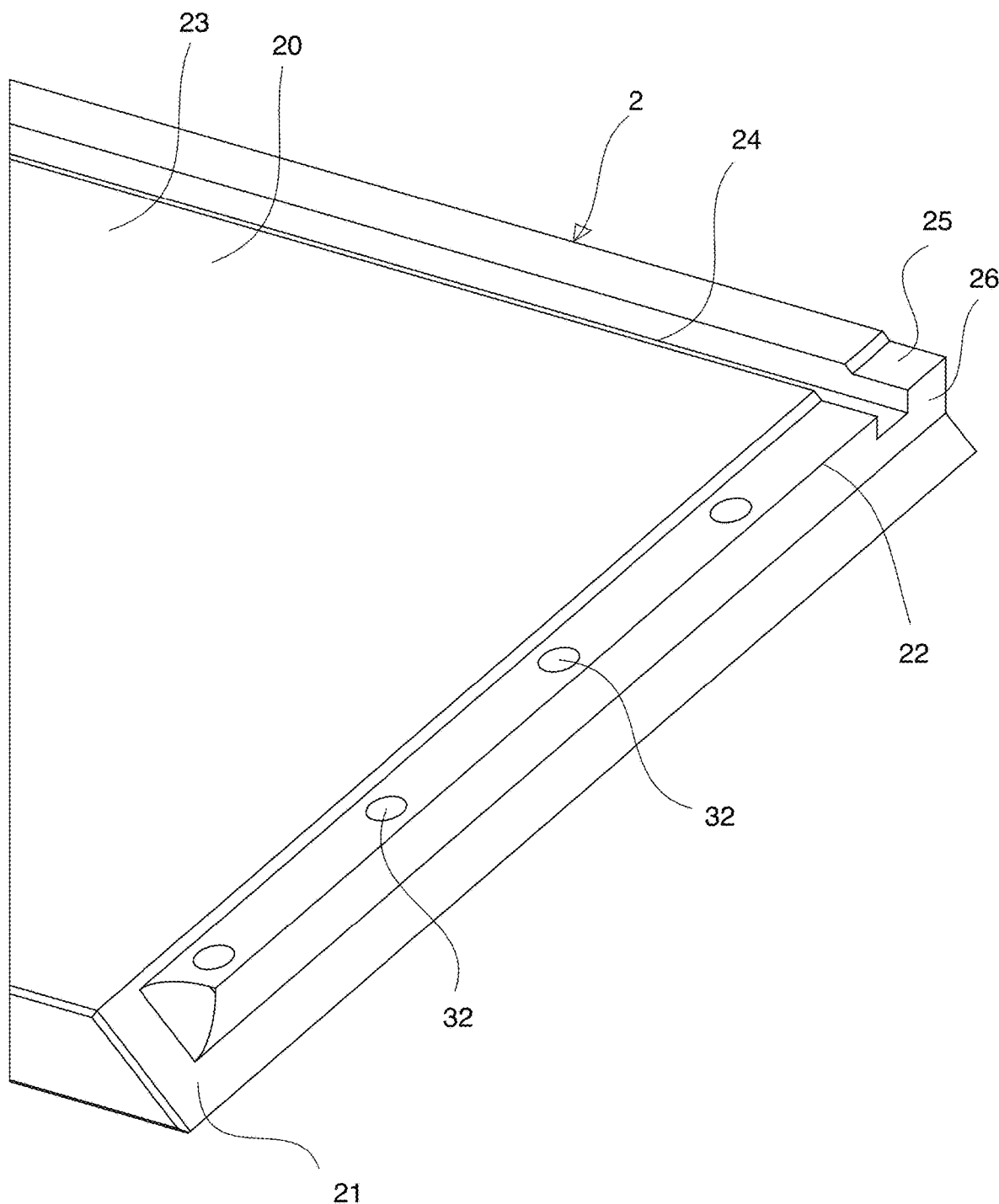
FIG. 6 shows the second panel of an aspect of the invention, where the second panel comprises a tongue.
Figure 8:
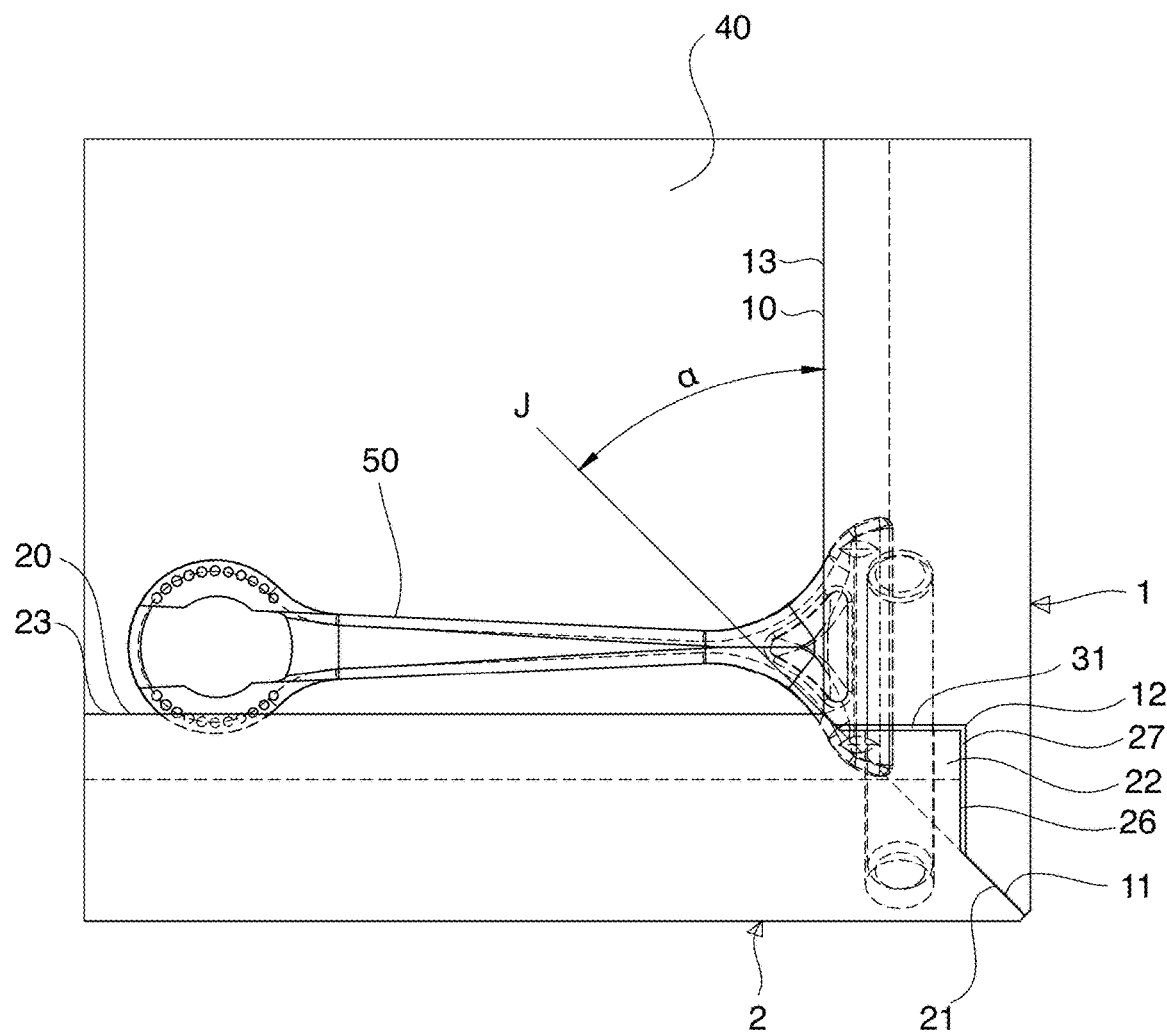
FIG. 8 shows an enlargement of a first panel and a second panel in a locked position, with a locking gear cooperating with the back panel and the first and second panel groove.
Figure 9A:
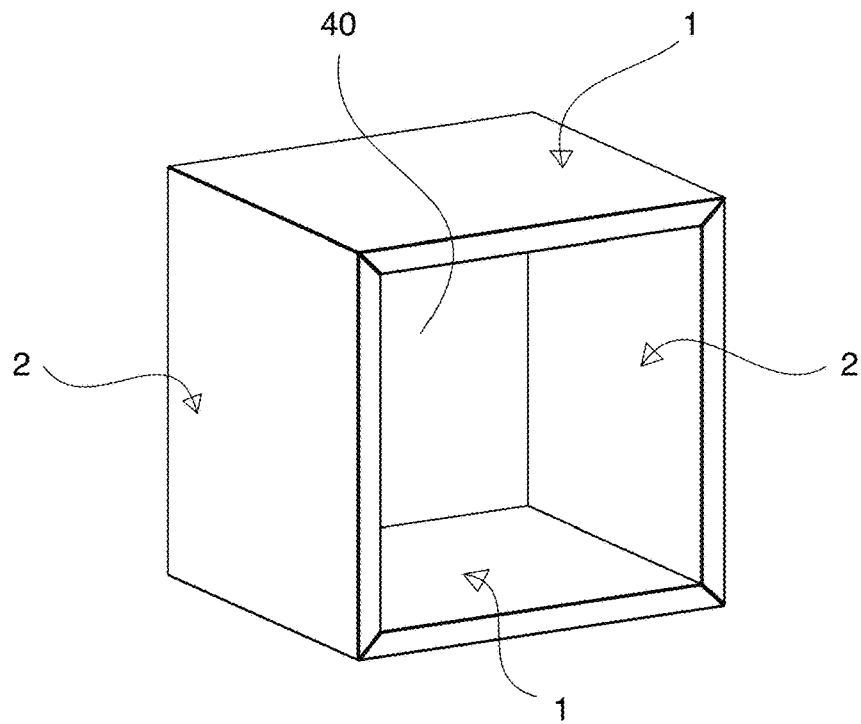
FIG. 9A-9B show 3D-views of an embodiment of a set of panels according to the invention in an assembled state.
Figure 9B:
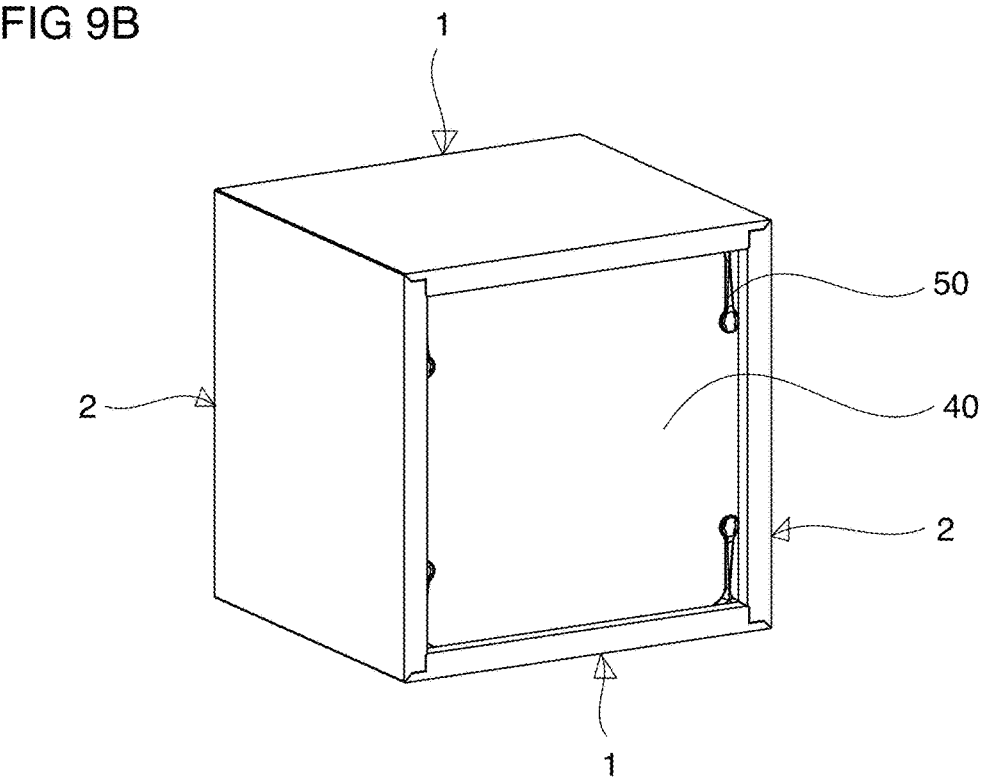

According to an aspect the first or second edge surface 11,21 may comprise a tongue 22, as is shown in FIGS. 6 and 8. This gives an increased stability to the set when assembled.

The tongue 22 may comprise a first tongue surface 25 and a second tongue surface 26.

Figure 7:
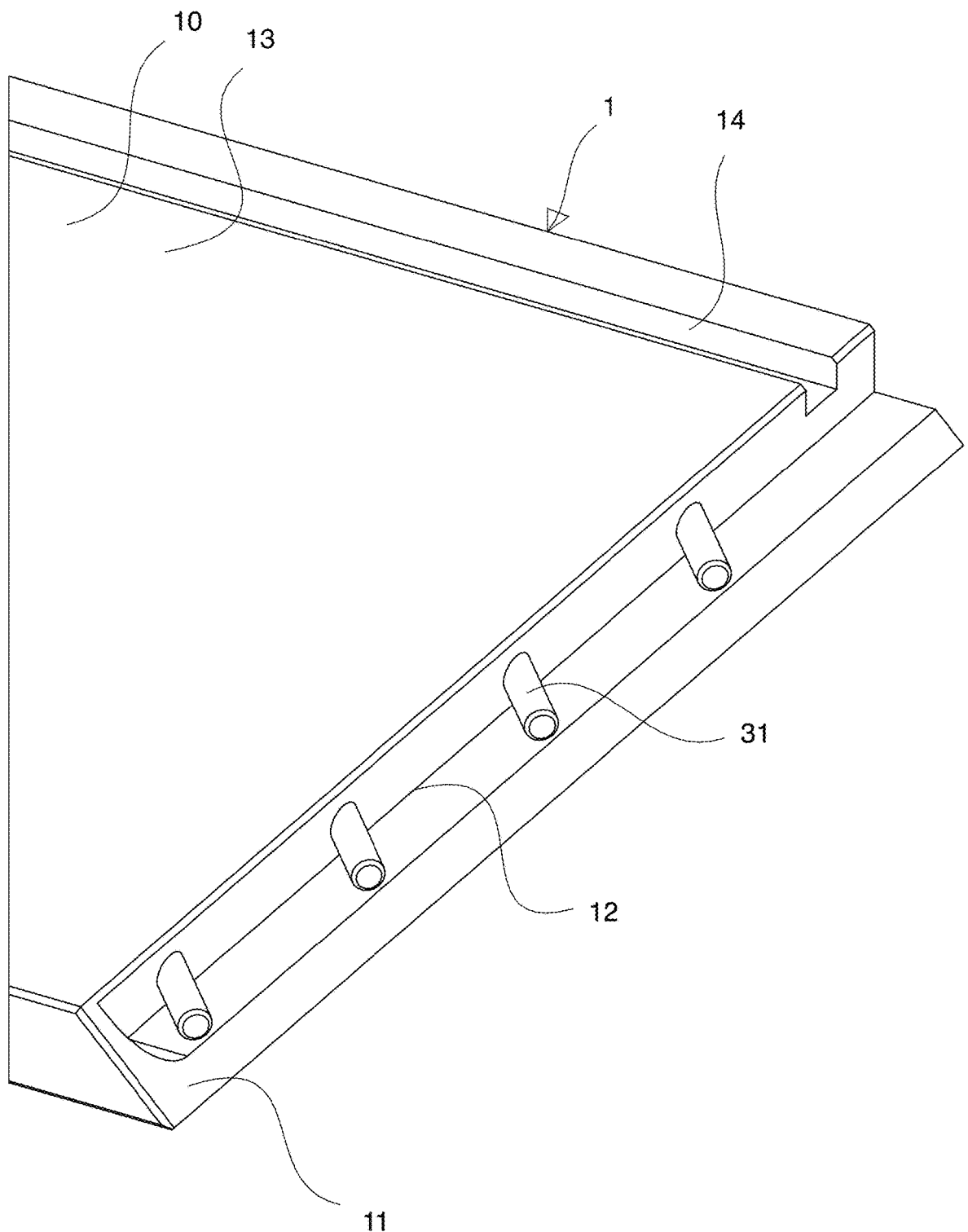
FIG. 7 shows the first panel of an aspect of the invention, where the first panel comprises a tongue groove.

The other of said opposite first or second edge surface 11,21 may comprise a tongue groove 12, as is shown in FIGS. 7 and 8.

In FIG. 8 it is shown that when the set comprising the first 1 and second 2 panel is in a locked position, the mechanical locking device may comprise a first space 27 between the tongue groove 12 and the first tongue surface 25 and/or the second tongue surface 26.

The tongue groove 12 may comprise one or more rod-shaped elements 31.

The rod element groove 36 may be reinforced. Such reinforcement may be done using e.g. plastic, e.g., thermoplastic, and/or liquid, e.g., PVAc-glue. This reduces the risk that of damages to the rod element groove 36 and the surrounding material.

FIGS. 2A-2F show different aspects of a locking gear 50 according to embodiments of the invention. The locking gear 50 may be configured to cooperate with the back panel 40, for locking of the back panel 40 to the first 1 and/or second 2 panel.

The locking gear 50 may be assembled to the set of panels when the first panel 1, the second panel 2 and the back panel 40 have been assembled. The locking gear 50 is inserted in the first panel groove 14 and/or the second panel groove 24, and thereby locks the first panel 1 to the second panel 2.

The locking gear 50 may lock the back panel 40 to the first panel groove 14 and/or the second panel groove 24 and thereby hinder the first panel 1 to be displaced in relation to the second panel 2 in a direction opposite to the assembly direction AD.

The locking gear 50 may be made of, e.g., wood based material, metal, a polymer material, etc.

The locking gear 50 may be flexible.

The locking gear 50 may comprise an elastic part.

The locking gear 50 may comprise a wedge shaped edge 61,62.

An embodiment of the locking gear 50, as shown in FIGS. 2A-2D, 3A, 4A, 8 and 9b, may comprise a lever arm 54 and an eccentric locking head 53 at a first end of the lever. The locking gear 50 may comprise at an opposite second end of the lever 54 a locking part 56.

When the eccentric head 53 is inserted in the first panel groove 14, the locking part 56 may be is inserted in the second panel groove 24, and vice versa.

The locking part 56 may comprise friction elements 64. The friction elements 64 may assist in the keeping locking part 56 in the first panel groove or the second panel groove.

The friction elements 64 may be made in one piece with the locking gear. The friction elements may be pointed or raised elements The lever arm 54 may be elastic to enable bending during the insertion of the locking part 53 may in the first panel groove 12 or the second panel groove 23. The bending of the lever arm 54 may create a locking force between the locking part and the first panel groove 14 or the second panel groove 24.

An outer part of the eccentric locking head 53 may be thicker than a part of the eccentric locking head 53 adjacent the first end of the lever.

Figure 2A:
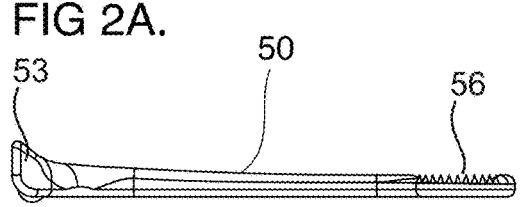
FIG. 2A-2F show enlargements of locking gears of an aspect of the invention.
Figure 2B:
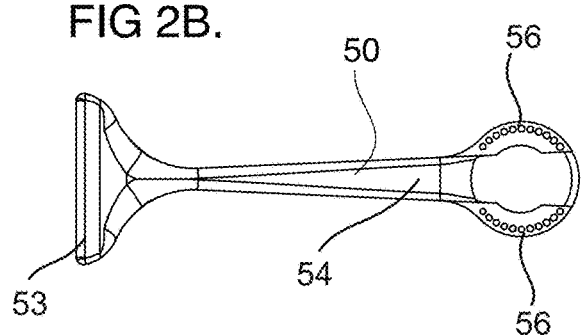
Figure 2C:
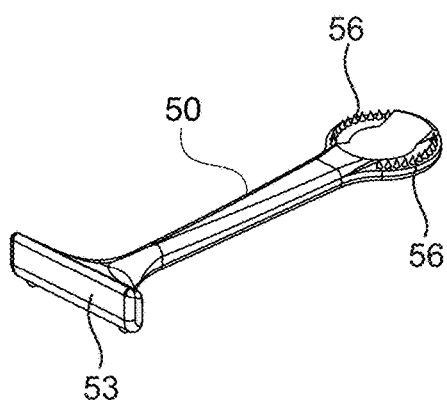
Figure 2D:
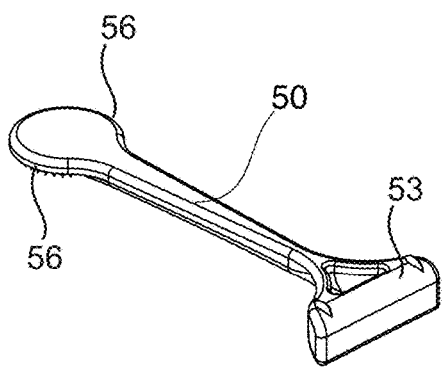
Figure 2E:
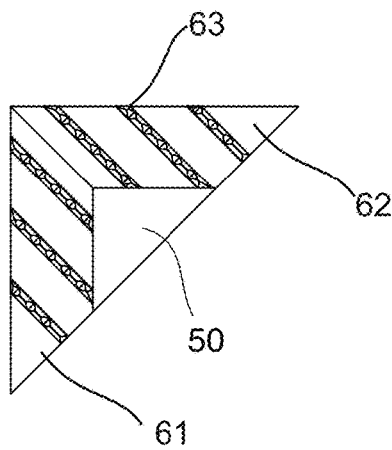
Figure 2F:
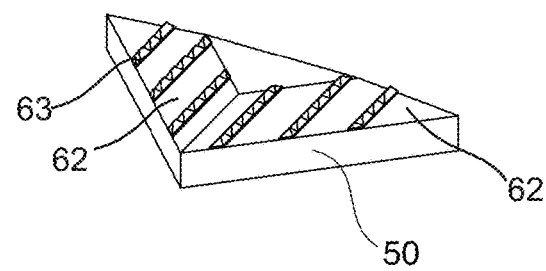
Figure 4A:
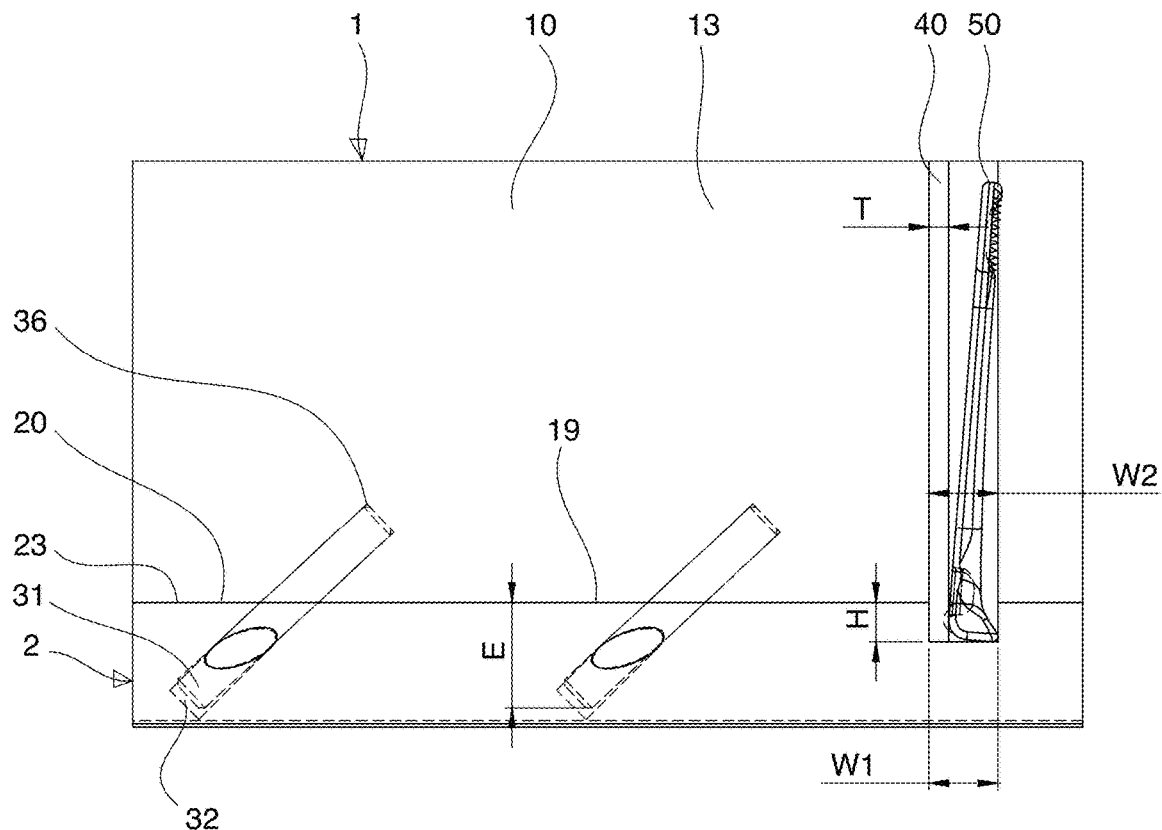
FIG. 4A shows an enlargement of part of the embodiment shown in FIG. 3A.
Figure 4B:
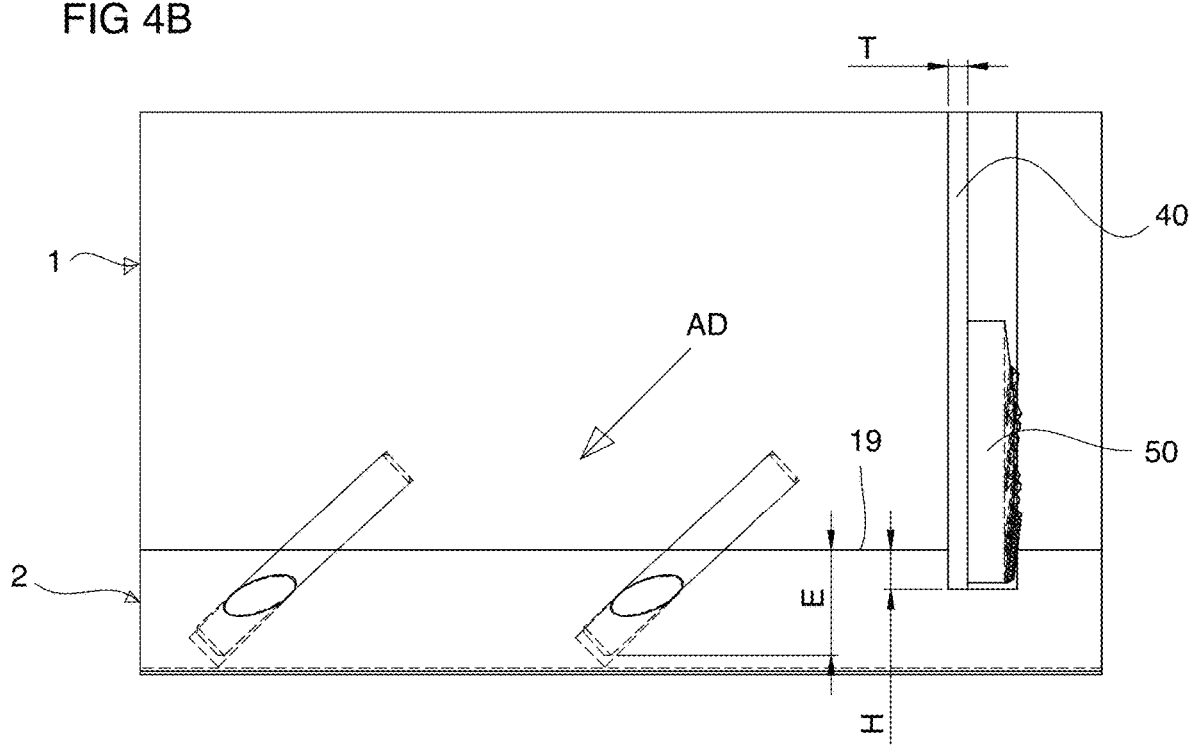
FIG. 4B shows an enlargement of a first and second panel in a locked position, where the locking gear is a wedge.
Figure 5A:
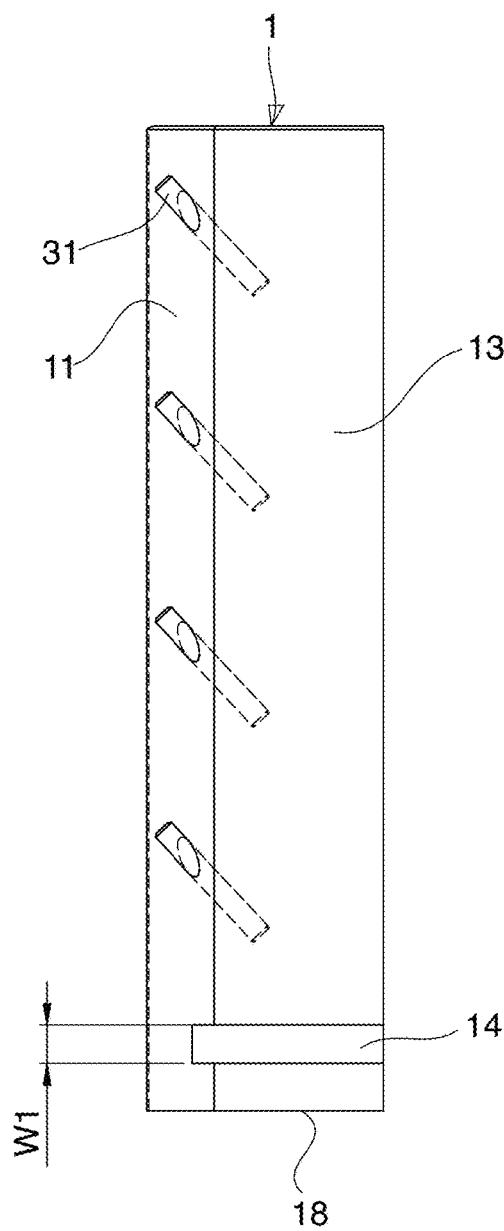
FIG. 5A shows part of the first panel of an aspect of the invention.
Figure 5B:
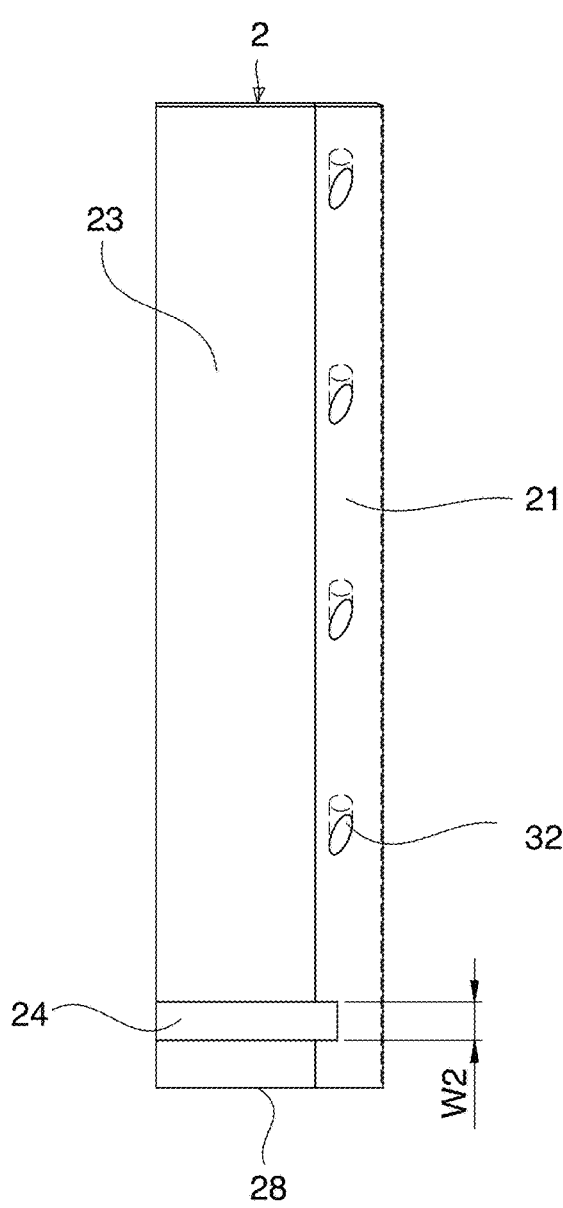
FIG. 5B shows part of the second panel of an aspect of the invention.

FIGS. 2E-2F and 4B show an embodiment of the locking gear 50 which comprises a first wedge shaped edge 61 and a second wedge shaped edge 62. The first wedge shaped edge 61 may be inserted in the in the first panel groove 14 and the second wedge shaped edge 62 may be inserted in the in the second panel groove 24 to lock the first panel 10, the second panel 20 and the back panel 40 to a locked position.

The locking gear 50 may, have a triangular shape as shown in FIG. 2E-2F or may optionally have a rectangular or square shape (not shown).

The first wedge shaped edge 61 and/or the second wedge shaped edge 62 may comprise friction elements 63. The friction elements 63 may assist in the keeping first wedge shaped edge 61 and/or the second wedge shaped edge 62 in the first panel groove and the second panel groove, respectively. The friction elements 63 may be made in one piece with the locking gear. The friction elements may be pointed or raised elements.

Figure 3A:
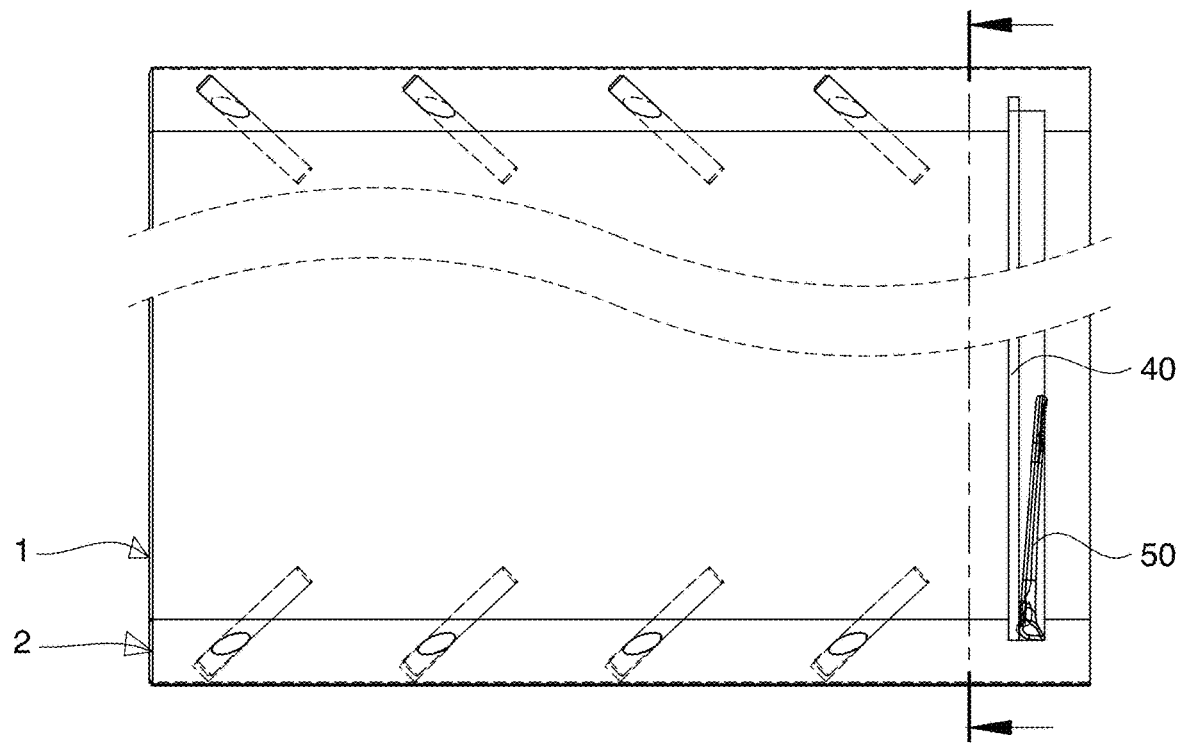
FIG. 3A shows an embodiment of the first panel and the second panel in a side-view in a locked position.
Figure 3B:
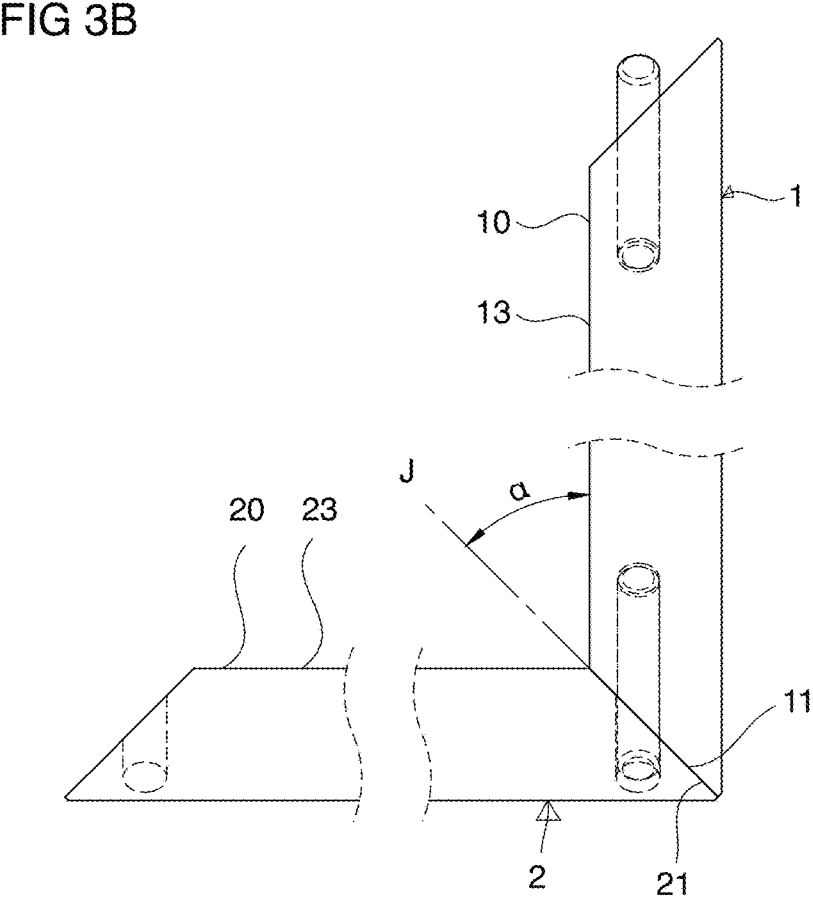
FIG. 3B shows an enlargement of part of the first panel and the second panel in a side-view in a locked position.

FIGS. 3A and 4A show the locking gear with the eccentric locking head 53 in the second locking groove 24 and the locking part 53 in the first panel groove 14. The eccentric locking head 53 end may have a rounded back side and a gripping edge on a front side.

The locking part 53 may have a smaller width than the eccentric locking head 53. The locking gear may be installed by placing the eccentric locking head 53 in a panel groove and rotating the locking gear along the rounded back side, such that the locking part 53 is rotated towards the back panel 40. The locking part 53 may angle away from the back panel 40. The locking gear may be configured, such that upon installation the locking part 53 may exert a force on an outside wall of panel groove.

The first panel 1 may comprise two or more of said first edge surfaces 11 according to the above. Put in another way, one or more rod-shaped elements 31 may be positioned at two or more of the edge surfaces of the first panel 1, as disclosed in FIG. 1A.

The second panel 2 may comprise two or more of said second edge surfaces 21 according to the above. Put in another way, one or more insertion grooves 32 may be positioned at two or more of the edge surfaces of the second panel 2.

The core of the first panel 1 and/or of the second panel 2 may be a wood-based core, such as MDF, HDF, OSB, WPC, plywood or particleboard. The core may also be a plastic core comprising thermosetting plastic or thermoplastic, e.g., vinyl, PVC, PU or PET. The plastic core may comprise fillers.

The first panel 1 and/or the second panel 2 may also be of solid wood.

The first panel 1 and/or the second panel 2 may be provided with a decorative layer, such as a foil or a veneer, on one or more surfaces.

According to an aspect the set of panels are resilient panels. The resilient panels may comprise a core comprising thermoplastic material. The thermoplastic material may be foamed.

The thermoplastic material may comprise polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof. The core may be formed of several layers.

The aspects described above may comprise a decorative layer, such as a decorative foil comprising a thermoplastic material. The thermoplastic material of the decorative layer may be or comprise polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof. The decorative foil is may be printed, for example by direct printing, rotogravure, or digital printing. According to an aspect the decorative layer comprises melamine, a high pressure laminate (HPL) or a veneer.

The aspects described above may comprise a wear layer such as a film or foil. The wear layer may comprise thermoplastic material. The thermoplastic material may be polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

The aspects described above may comprise a wood base core, such as HDF, MDF, plywood, particleboard, OSB or Masonite.

The different aspects, embodiments and alternatives described above may be combined with one or more of the other described aspects, embodiments and alternatives.

Further embodiments of the invention are described below.

1. A set comprising a first panel 1 with a first main plane 10 and a first panel surface 13, a second panel 2 with a second main plane 20 and a second panel surface 23, a back panel 40 and a mechanical locking device for locking of a first edge surface 11 of the first panel 1 to a second edge surface 21 of the second panel 2 at a junction plane J, wherein
the first main plane 10 is essentially perpendicular to the second main plane 20 and the junction plane J extends at a first angle α to the first main plane 10,
the mechanical locking device comprises at least one rod-shaped element 31 at the first edge surface 11 and at least one insertion groove 32 at the second edge surface 21,
the rod-shaped element 31 is configured to be inserted into the insertion groove 32,
the rod-shaped element 31 extends at a second angle β from the first edge surface 11,
the insertion groove 32 extends into the second edge surface 21 at a third angle γ from the second edge surface 21,
the mechanical locking device further comprises a first panel groove 14 on a first panel surface 13 on the first panel 1, and/or a second panel groove 24 on the second panel surface 23 of the second panel 2, wherein the back panel 40 is configured to cooperate with at least one of the first panel groove 14 and the second panel groove 24, and at least one locking gear 50 configured to cooperate with the back panel 40 and at least one of the first panel groove 14 and the second panel groove 24, for locking of the first panel 1 to the second panel 2,
wherein the first angle α between the junction plane J and the first main plane 10 may optionally be about 45°.

2. The set as described in embodiment 1, wherein a width W1, W2 of at least one of the first panel groove 14 and the second panel groove 24 minus a thickness T of the back panel 40 is larger than or essentially the same as an extension E of the rod-shaped element 31 along the first edge surface 11.

3. The set as described in any of the preceding embodiments, wherein the second angle β is within the range of about 30° to about 60°, or within the range of about 40° to about 50°, or about 45°.

4. The set as described in any of the previous embodiments, wherein the mechanical locking device comprises at least two rod-shaped elements 31.

5. The set as described in embodiment 4, wherein the mechanical locking device comprises two or more rod-shaped elements 31, arranged in a row essentially parallel to the first or second edge surface 11,21.

6. The set as described in any of the previous embodiments, wherein the rod-shaped element 31 is arranged in a rod element groove 36 in the first edge surface 11.

7. The set as described in embodiment 6, wherein the rod element groove 36 is a drill hole.

8. The set as described in embodiment 7, wherein the drill hole is a bottom-ended drill hole.

9. The set as described in any of the previous embodiments, wherein the width W1 of the first panel groove 14 is essentially the same as the width W2 of the second panel groove 24.

10. The set as described in any of the previous embodiments, wherein the first panel 1 comprises a third edge surface 18, the second panel 2 comprises a fourth edge surface 28, the first panel groove 14 is substantially parallel to the third edge surface 18 and the second panel groove 24 is substantially parallel to the fourth edge surface 28.

11. The set as described in embodiment 10, wherein the first panel groove 14 extends substantially along the entire third edge surface 18 and the second panel groove 24 extends essentially along the entire fourth edge surface 28.

12. The set as described in any of the previous embodiments, wherein at least one of the first panel groove 14 and the second panel groove 24 is bottom-ended.

13. The set as described in any of the previous embodiments, wherein the locking gear 50 is configured to further cooperate with the back panel 40, for locking of the back panel 40 to the first 1 and/or second 2 panel.

14. The set as described in any of the previous embodiments, wherein the locking gear 50 is flexible.

15. The set as described in any of the previous embodiments, wherein the locking gear 50 comprises an elastic part.

16. The set as described in any of embodiment 1-14, wherein the locking gear 50 comprises a wedge shaped edge 61, 62.

17. The set as described in any of the previous embodiments, wherein an extension H of the back panel from the intersection 19 between the first edge surface 11 and the first panel surface 13 of the first panel 1, when one first panel 1, one second panel 2 and one back panel 40 have been assembled, is less than an extension of the rod shaped element 31 from said intersection 19.

18. The set as described in any of the previous embodiments, wherein the first or second edge surface 11,21 comprises a tongue 22, wherein said tongue 22 comprises a first tongue surface 25 and a second tongue surface 26 and the other of said opposite first or second edge surface 11,21 comprises a tongue groove 12.

19. The set as described in embodiment 18, wherein the mechanical locking device comprises a first space 27 between the tongue groove 12 and the first tongue surface 25 and/or the second tongue surface 26 when the set is in a locked position.

20. The set as described in embodiment 18 or 19, wherein the tongue groove 12 comprises one or more rod-shaped elements 31.

21. The set as described in any one of embodiment 6 to 20, wherein the rod element groove 36 is reinforced by plastic, e.g. thermoplastic and/or liquid, e.g. PVAc-glue.

The invention claimed is:

1. A set comprising a first panel with a first main plane and a first panel surface, a second panel with a second main plane and a second panel surface, a back panel and a mechanical locking device with a junction plane, wherein the mechanical locking device is configured for locking a first edge surface of the first panel to a second edge surface of the second panel at the junction plane, wherein first panel, the second panel and the back panel are wood based furniture panels, wherein the first main plane is essentially perpendicular to the second main plane and the junction plane extends at a first angle to the first main plane, wherein the mechanical locking device comprises at least one rod-shaped element at the first edge surface and at least one insertion groove at the second edge surface, wherein the at least one rod-shaped element is configured to be inserted into the insertion groove, wherein the at least one rod-shaped element extends at a second angle from the first edge surface, the at least one rod-shaped element being inclined relative to a longitudinal axis of the first edge surface, the longitudinal axis of the first edge surface being essentially parallel to the first and second main planes, wherein the insertion groove extends into the second edge surface at a third angle from the second edge surface, wherein the mechanical locking device further comprises a first panel groove on the first panel surface on the first panel, and/or a second panel groove on the second panel surface of the second panel, wherein the back panel is configured to cooperate with at least one of the first panel groove and the second panel groove, and at least one locking gear configured to cooperate with the back panel and at least one of the first panel groove and the second panel groove, for locking of the first panel to the second panel, and wherein the first angle between the junction plane and the first main plane is about 45°.

2. The set as claimed in claim 1, wherein the second angle ($\beta$) is within the range of about 30° to about 60°.

3. The set as claimed in claim 1, wherein the at least one rod-shaped element comprises at least two rod-shaped elements.

4. The set as claimed in claim 3, wherein two or more of the at least two rod-shaped elements are arranged in a row essentially parallel to the first or second edge surface.

5. The set as claimed in claim 1, wherein the at least one rod-shaped element is arranged in a rod element groove in the first edge surface.

6. The set as claimed in claim 5, wherein the rod element groove is a drill hole.

7. The set as claimed in claim 6, wherein the drill hole is a bottom-ended drill hole.

8. The set as claimed in claim 1, wherein the locking gear is configured to further cooperate with the back panel, for locking of the back panel to the first and/or second panel.

9. The set as claimed in claim 1, wherein the locking gear is flexible.

10. The set as claimed in claim 1, wherein the locking gear comprises a wedge shaped edge.

11. The set as claimed in claim 1, wherein the first or second edge surface comprises a tongue, wherein said tongue comprises a first tongue surface and a second tongue surface and the other of said opposite first or second edge surface comprises a tongue groove.

12. The set as claimed in claim 11, wherein the mechanical locking device comprises a first space between the tongue groove and the first tongue surface and/or the second tongue surface when the set is in a locked position.

13. The set as claimed in claim 11, wherein the tongue groove comprises the at least one rod-shaped element.

14. A set comprising a first panel with a first main plane and a first panel surface, a second panel with a second main plane and a second panel surface, a back panel and a mechanical locking device with a junction plane, wherein the mechanical locking device is configured for locking a first edge surface of the first panel to a second edge surface of the second panel at the junction plane, wherein first panel, the second panel and the back panel are wood based furniture panels, wherein the first main plane is essentially perpendicular to the second main plane and the junction plane extends at a first angle to the first main plane, wherein the mechanical locking device comprises at least one rod-shaped element at the first edge surface and at least one insertion groove at the second edge surface, wherein the at least one rod-shaped element is configured to be inserted into the insertion groove, wherein the at least one rod-shaped element extends at a second angle from the first edge surface, wherein the insertion groove extends into the second edge surface at a third angle from the second edge surface, wherein the mechanical locking device further comprises a first panel groove on the first panel surface on the first panel, and/or a second panel groove on the second panel surface of the second panel, wherein the back panel is configured to cooperate with at least one of the first panel groove and the second panel groove, and at least one locking gear configured to cooperate with the back panel and at least one of the first panel groove and the second panel groove, for locking of the first panel to the second panel, wherein the first angle between the junction plane and the first main plane is about 45, and wherein a width of at least one of the first panel groove and the second panel groove minus a thickness (T) of the back panel is larger than or essentially the same as an extension of the at least one rod-shaped element along the first edge surface.

15. A set comprising a first panel with a first main plane and a first panel surface, a second panel with a second main plane and a second panel surface, a back panel and a mechanical locking device with a junction plane, wherein the mechanical locking device is configured for locking a first edge surface of the first panel to a second edge surface of the second panel at the junction plane, wherein first panel, the second panel and the back panel are wood based furniture panels, wherein the first main plane is essentially perpendicular to the second main plane and the junction plane extends at a first angle to the first main plane, wherein the mechanical locking device comprises at least one rod-shaped element at the first edge surface and at least one insertion groove at the second edge surface, wherein the at least one rod-shaped element is configured to be inserted into the insertion groove, wherein the at least one rod-shaped element extends at a second angle from the first edge surface, wherein the insertion groove extends into the second edge surface at a third angle from the second edge surface, wherein the mechanical locking device further comprises a first panel groove on the first panel surface on the first panel, and/or a second panel groove on the second panel surface of the second panel, wherein the back panel is configured to cooperate with at least one of the first panel groove and the second panel groove, and at least one locking gear configured to cooperate with the back panel and at least one of the first panel groove and the second panel groove, for locking of the first panel to the second panel, wherein the first angle between the junction plane and the first main plane is about 45, and wherein an extension of the back panel from the intersection between the first edge surface and the first panel surface of the first panel, when one first panel, one second panel and one back panel have been assembled, is less than an extension of the rod shaped element from said intersection.

\* \* \* \* \*

UNITED STATES PATENT AND TRADEMARK OFFICE
CERTIFICATE OF CORRECTION

PATENT NO. : 12,025,162 B2  
APPLICATION NO. : 17/185403  
DATED : July 2, 2024  
INVENTOR(S) : Johan Svensson et al.

Page 1 of 1

It is certified that error appears in the above-identified patent and that said Letters Patent is hereby corrected as shown below:

In the Claims

Column 11, Lines 34-35, Claim 2:
"the second angle ($\beta$) is within the range"
Should read:
-- the second angle is within the range --

Column 12, Lines 31, Claim 14:
"about 45"
Should read:
-- about 45° --

Column 13, Line 2, Claim 15:
"about 45"
Should read:
-- about 45° --

Signed and Sealed this
Eighth Day of April, 2025

Coke Morgan Stewart
*Acting Director of the United States Patent and Trademark Office*